(12) United States Patent
Li et al.

(10) Patent No.: US 9,530,024 B2
(45) Date of Patent: Dec. 27, 2016

(54) RECOMMENDATION SYSTEM FOR PROTECTING USER PRIVACY

(71) Applicant: AUTODESK, INC., San Rafael (CA)

(72) Inventors: Wei Li, Richmond Hill (CA); Justin Frank Matejka, Newmarket (CA); Tovi Grossman, Toronto (CA); George Fitzmaurice, Toronto (CA)

(73) Assignee: AUTODESK, INC., San Rafael, CA (US)

( * ) Notice: Subject to any disclaimer, the term of this patent is extended or adjusted under 35 U.S.C. 154(b) by 27 days.

(21) Appl. No.: 14/333,063

(22) Filed: Jul. 16, 2014

(65) Prior Publication Data

US 2016/0019400 A1   Jan. 21, 2016

(51) Int. Cl.
   *H04L 29/06*   (2006.01)
   *G06F 21/62*   (2013.01)
   *G06F 7/04*    (2006.01)
   *G06F 17/30*   (2006.01)
   *H04N 7/16*    (2011.01)

(52) U.S. Cl.
   CPC ....... *G06F 21/6245* (2013.01); *H04L 63/0407* (2013.01)

(58) Field of Classification Search
   None
   See application file for complete search history.

(56) References Cited

U.S. PATENT DOCUMENTS

| | | | |
|---|---|---|---|
| 2010/0106737 A1* | 4/2010 | Fitzmaurice et al. | 707/769 |
| 2011/0010244 A1* | 1/2011 | Hatridge et al. | 705/14.53 |
| 2011/0126154 A1* | 5/2011 | Boehler et al. | 715/811 |
| 2012/0198495 A1* | 8/2012 | Nishikawa | 725/40 |
| 2013/0124557 A1* | 5/2013 | Goode et al. | 707/769 |
| 2013/0132899 A1* | 5/2013 | Scott | 715/810 |
| 2013/0219333 A1* | 8/2013 | Palwe et al. | 715/810 |
| 2014/0136672 A1* | 5/2014 | Sullivan et al. | 709/223 |
| 2014/0201672 A1* | 7/2014 | Borzello et al. | 715/779 |
| 2014/0330975 A1* | 11/2014 | Abuelsaad et al. | 709/226 |
| 2015/0082218 A1* | 3/2015 | Affoneh et al. | 715/771 |

OTHER PUBLICATIONS

Ahmad, W. and Khokhar, A. (2007). An Architecture for Privacy Preserving Collaborative Filtering on Web Portals. Proceedings of the Third International Symposium on Information Assurance and Security. 273-278.

(Continued)

*Primary Examiner* — Shin-Hon Chen (74) *Attorney, Agent, or Firm* — Artegis Law Group, LLP (57) ABSTRACT

One embodiment of the present invention sets forth a technique for providing application command recommendations to a privacy-sensitive client device. The technique includes receiving a command log from each general client device included in a plurality of general client devices and analyzing the command logs to generate a command recommendation file. The command recommendation file may indicate a relationship between one or more application commands executed by at least one of the general client devices and one or more application commands that are available for execution by the privacy-sensitive client device. The technique further includes transmitting the command recommendation file to the privacy-sensitive client device.

22 Claims, 5 Drawing Sheets

(56) References Cited

OTHER PUBLICATIONS

Baecker, R., Booth, K., Jovicic, S., McGrenere, J. and Moore, G. (2000). Reducing the gap between what users know and what they need to know. Universal Usability-2000. 17-23.
Berkovsky, S., Eytani, Y., Kuflik, T. and Ricci, F. (2007). Enhancing privacy and preserving accuracy of a distributed collaborative filtering. Proceedings of the 2007 ACM conference on Recommender systems. 9-16.
Ding, Y. and Li, X. (2005). Time weight collaborative filtering. Proceedings of the 14th ACM international conference on Information and knowledge management. 485-492.
Fischer, G. (2001). User Modeling in Human\–Computer Interaction. User Modeling and User-Adapted Interaction. 11(1-2):65-86.
Frankowski, D., Cosley, D., Sen, S., Terveen, L. and Riedl, J. (2006). You are what you say: privacy risks of public mentions. Proceedings of the 29th annual international ACM SIGIR conference on Research and development in information retrieval. 565-572.
Grossman, T., Fitzmaurice, G. and Attar, R. (2009). A Survey of Software Learnability: Metrics, Methodologies and Guidelines. ACM CHI conference on Human Factors in Computing Systems. 10 pages.
Herlocker, J. L., Konstan, J. A., Terveen, L. G. and Riedl, J. T. (2004). Evaluating collaborative filtering recommender systems. ACM Trans. Inf. Syst. 22(1):5-53.
Hill, W., Stead, L., Rosenstein, M. and Furnas, G. (1995). Recommending and evaluating choices in a virtual community of use Proceedings of the SIGCHI conference on Human factors in computing systems. 194-201.
Jones, K. S. (1972). A statistical interpretation of specificity and its application in retrieval. Journal of Documentation. 60(5):10.
Karypis, G. (2001). Evaluation of Item-Based Top-N. Recommendation Algorithms. Proceedings of the tenth international conference on Information and knowledge management. 247-254.
Linden, G., Smith, B. and York, J. (2003). Amazon.com Recommendations: Item-to-Item Collaborative Filtering. IEEE Internet Computing. 7(1):76-80.
Linton, F. and Schaefer, H.-P. (2000). Recommender Systems for Learning: Building User and Expert Models through Long-Term Observation of Application Use. User Modeling and User-Adapted Interaction. 10(2-3)181-208.
Matejka, J., Li, W., Grossman, T. and Fitzmaurice, G. (2009). CommunityCommands: Command Recommendations for Software Applications. Proceedings of the 22nd Symposium on User Interface Software and Technology.193-202.
Miller, B. N., Albert, I., Lam, S. K., Konstan, J. A. and Riedl, J. (2003). MovieLens unplugged: experiences with an occasionally connected recommender system. Proceedings of the 8th international conference on Intelligent user interfaces. 263-266.
Mitchell, J. and Shneiderman, B. (1989). Dynamic versus static menus: an exploratory comparison. SIGCHI Bull. 20 (4):33-37.
Schein, A., Popescul, A., Ungar, L., Pennock, D. (2001). Generative Models for Cold-Start Recommendations. the 2001 SIGIR Workshop on Recommender Systems.
Ramakrishnan, N., Keller, B. J., Mirza, B. J., Grama, A. Y. and Karypis, G. (2001). Privacy Risks in Recommender Systems. IEEE Internet Computing. 5(6):54-62.
Resnick, P., Iacovou, N., Suchak, M., Bergstrom, P. and Riedl, J. (1994). GroupLens: an open architecture for collaborative filtering of netnews. Proceedings of the 1994 ACM conference on Computer supported cooperative work. 175-186.
Shardanand, U. and Maes, P. (1995). Social information filtering: algorithms for automating "word of mouth". Proceedings of the SIGCHI conference on Human factors in computing systems. 210-217.
Shneiderman, B. (1983). Direct Manipulation: A Step Beyond Programming Languages. Computer. 16(8):57-69.
Shokri, R., Pedarsani, P., Theodorakopoulos, G. and Hubaux, J.P. (2009). Preserving privacy in collaborative filtering through distributed aggregation of offline profiles. Proceedings of the third ACM conference on Recommender systems. 157-164.
Twidale, M. B. (2005). Over the Shoulder Learning: Supporting Brief Informal Learning. Comput. Supported Coop. Work. 14(6):505-547.
Li, W., Matejka, J., Grossman, T., Konstan, J. A. and Fitzmaurice, G. (2011) Design and Evaluation of a Command Recommendation System for Software Applications. ACM Trans. Comput.-Hum. Interact., 18(2):6:1-6:35.

\* cited by examiner

|  | Command 1 | Command 2 | Command 3 | Command 4 | Command 5 | Command 6 |
|---|---|---|---|---|---|---|
| Command 1 | x | | | | | |
| Command 2 | 0.31 | x | | | | |
| Command 3 | 0.17 | 0.30 | x | | | |
| Command 4 | 0.72 | 0.43 | 0.76 | x | | |
| Command 5 | 0.60 | 0.84 | 0.22 | 0.56 | x | |
| Command 6 | 0.09 | 0.14 | 0.26 | 0.18 | 0.25 | x |

RECOMMENDATION SYSTEM FOR PROTECTING USER PRIVACY

BACKGROUND OF THE INVENTION

1. Field of the Invention

The present invention generally relates to computer software, and, more specifically, to a recommendation system for protecting user privacy.

2. Description of the Related Art

A wide variety of software applications are currently available to end-users, including computer-aided design (CAD) applications, computer graphics applications, animation applications, word processing applications, and computer programming applications, among others. Many of these software applications allow an end-user to interact with the software application via a graphical user interface (GUI). Conventional GUIs often provide the end-user with access to a set of commands that can be used to perform various operations within a workspace generated by the software application. For example, a CAD application may provide a set of drawing commands that can be used to create complex designs within a drawing workspace generated by the CAD application. In such a case, each command may be represented within the GUI with an icon that the end-user can select in order to execute the command.

Despite advances in application design that allow end-users to more easily operate complex applications, learning how to use such applications can still be problematic. More complex applications, such as the CAD application described above, often include thousands of commands to choose from and many ways for an end-user to combine these commands into workflows. Further, the number of commands tends to increase year after year. While the growth of commands increases a software application's capabilities, the quantity of commands presents a challenge for users that are attempting to learn how to use the software application. In particular, a user's lack of awareness of useful commands can decrease the user's efficiency with the software application.

In an effort to introduce users to unknown commands, many applications include content such as a "tip-of-the-day." However, although this type of help content may expose a user to new commands, the commands presented to the user may be irrelevant to the user's current task, making it less likely that the user will integrate the new commands into his or her workflow.

In order to suggest more relevant commands to a user, some software applications transmit the user's preferences to a server. The server then analyzes the user's preferences in order to provide suggestions that may be beneficial to the user. Such systems generally require a user to "opt-in" before recommendations are provided. However, due to privacy concerns and/or confidentiality requirements, many users are reluctant to opt-in to such recommendation systems and allow user activity data to be provided to a server that is controlled by a third-party. Further, even if a user chooses to opt-in to the recommendation system, the user is unable to receive recommendations unless the user is connected to the Internet. Consequently, many users are unable to receive recommendations from such systems, preventing the users from learning useful commands that are offered by the application.

As the foregoing illustrates, there is a need in the art for a more effective way for privacy-sensitive and/or offline users to receive command recommendations when interacting with a software application.

SUMMARY OF THE INVENTION

One embodiment of the present invention sets forth a method for providing application command recommendations to a privacy-sensitive client device. The method includes receiving a command log from each general client device included in a plurality of general client devices and analyzing the command logs to generate a command recommendation file. The command recommendation file may indicate a relationship between one or more application commands executed by at least one of the general client devices and one or more application commands that are available for execution by the privacy-sensitive client device. The method further includes transmitting the command recommendation file to the privacy-sensitive client device.

Another embodiment of the present invention sets forth a method for providing application command recommendations to a privacy-sensitive client device. The method includes receiving a command recommendation file from a server. The command recommendation file indicates a relationship between one or more application commands executed by a plurality of general client devices and one or more application commands that are available for execution by the privacy-sensitive client device. The method further includes determining one or more application commands executed by the privacy-sensitive device and generating one or more application command recommendations based on the one or more application commands executed by the privacy-sensitive device.

Further embodiments provide a non-transitory computer-readable medium to carry out one or more of the methods set forth above.

Advantageously, the disclosed technique enables a client device to receive application command recommendations—based on application commands that were previously issued by a user of the client device—without requiring the client device to transmit its application activity data to a third-party server. As such, a user of a privacy-sensitive client device can receive command recommendations that are relevant to the user's workflow without revealing sensitive application data. Additionally, application command recommendations can be provided by the client device in real-time, even when the client device is offline.

BRIEF DESCRIPTION OF THE DRAWINGS

So that the manner in which the above recited features of the invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

Figure 1:
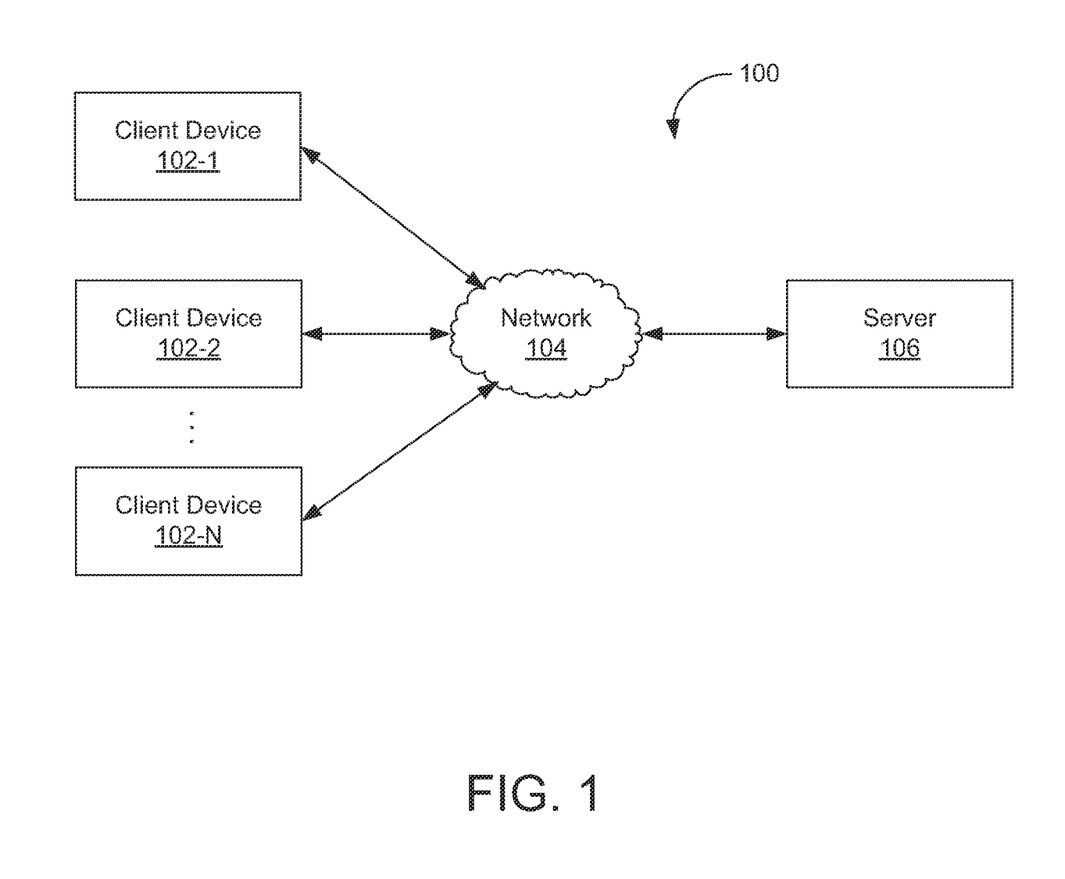
FIG. 1 illustrates a system configured to implement one or more aspects of the present invention.

FIG. 1 illustrates a system 100 configured to implement one or more aspects of the present invention. As shown, the system 100 includes, without limitation, one or more client devices 102 configured to transmit data to and receive data from a server 106 through a network 104. More specifically, as discussed in greater detail below in conjunction with FIG. 2, each client device 102 executes at least one software application and a recommendation engine. The recommendation engine within each client device 102 receives a command recommendation file—which includes ratings associated with various application commands that may be issued by the user of the client device 102—over the network from the server 106. The recommendation engine then uses the command recommendation file to generate recommended commands, which are displayed to the user. Additionally, the recommendation engine may transmit one or more command logs—which describe application commands that have been issued by the user of the client device 102—over the network 104 to the server 106.

After receiving command logs from one or more client devices 102, a recommendation file generator included in the server 106 generates and/or updates the command recommendation file. Each command log received from a client device 102 may describe the activities that were performed by the user of the client device when interacting with a software application. The recommendation file generator analyzes the users' activities in order to determine relationships (e.g., similarities) between various application commands. These relationships may be stored in the form of a ratings matrix, each entry of which indicates the relationship between two of more application commands. The resulting command recommendation file is then transmitted to the client devices 102.

The client device 102 may be any type of electronic device that enables a user to connect to (e.g., via the Internet, a local area network (LAN), an ad hoc network, etc.) and communicate with the server 106. Exemplary electronic devices include, without limitation, desktop computing devices, portable or hand-held computing devices, laptops, tablets, smartphones, mobile phones, personal digital assistants (PDAs), etc. In some embodiments, at least one client device 102 may be configured to provide the functionality of the server 106, thereby eliminating the necessity of a separate and dedicated server 106. In such an embodiment, the recommendation file generator that resides in the server 106, as described below in conjunction with FIG. 2, may instead reside within one or more client devices 102, and the different client devices 102 of FIG. 1 may communicate directly with each other, for example, via a peer-to-peer protocol.

Figure 2:
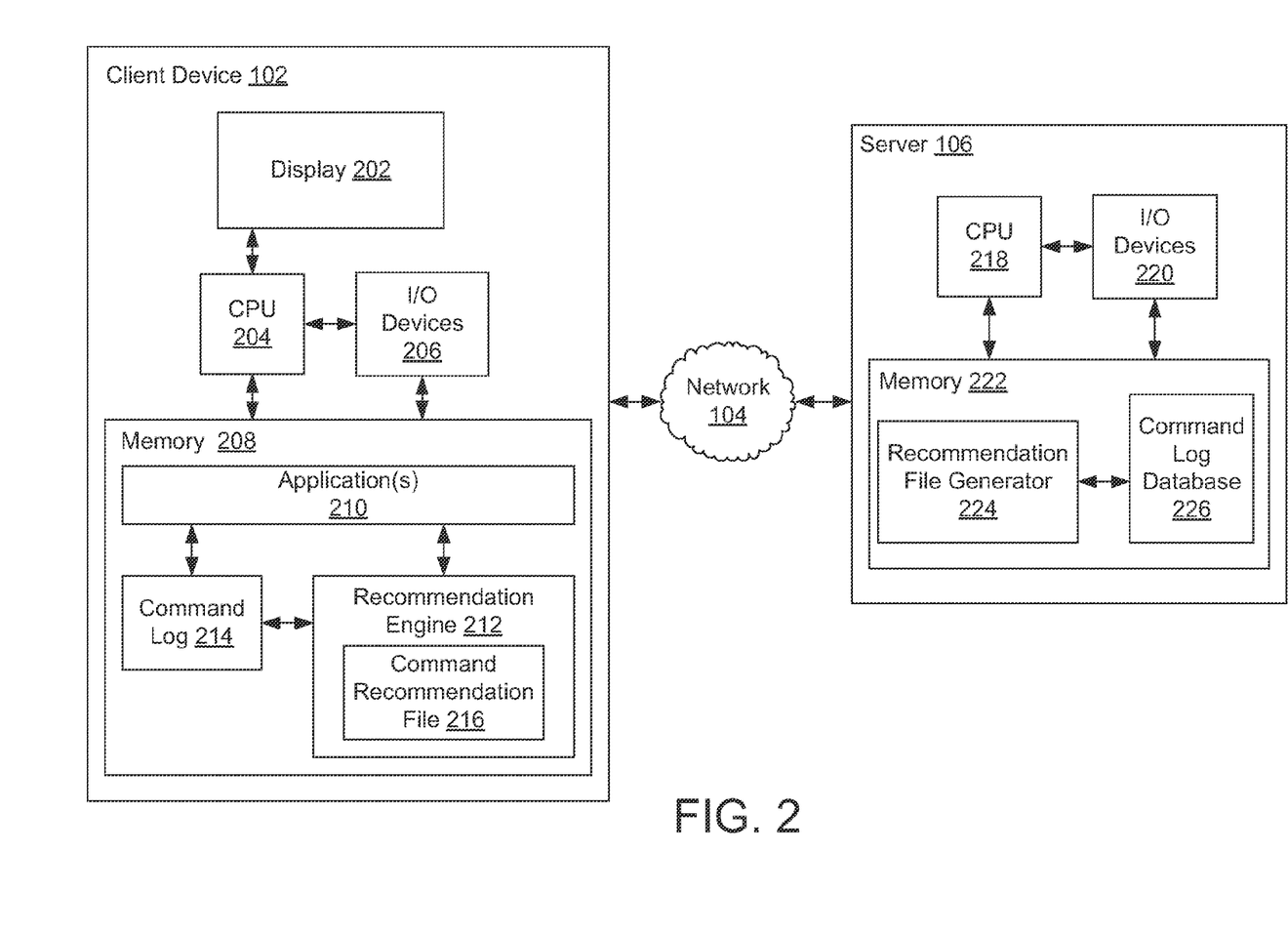
FIG. 2 sets forth more detailed illustrations of one of the client devices and the server of FIG. 1, according to one embodiment of the present invention.

FIG. 2 sets forth more detailed illustrations of one of the client devices 102 and the server 106 of FIG. 1, according to one embodiment of the present invention. As shown, the client device 102 includes, without limitation, a display 202, a central processing unit (CPU) 204, one or more input/output (I/O) devices 206, and a memory 208. The memory 208 is configured to store software application(s) 210, a recommendation engine 212, and a command log 214. The CPU 204 is configured to execute the software application(s) 210 and the recommendation engine 212. The software application 210 may be any type of software application, such as a content editing application, a product engineering application, an entertainment application, an information management application, etc. However, in the exemplary embodiments described herein, the software application 210 is a computer-aided design (CAD) application.

A user of the CAD application may issue commands through an I/O device 206, for example, in order to prepare or modify design documents associated with the CAD application. Commands issued by the user are then recorded in the command log 214. In various embodiments, commands stored in the command log 214 may include, for example, application functions performed by the user, application tools selected by the user, and items (e.g., design files, audio files, video files, image files, HTML links, web pages, etc.) the user has viewed, listened to, or otherwise selected. For example, a user of an Internet browser, entertainment application, set-top box, or other electronic device may issue commands to select digital content, such as video titles, audio titles (e.g., music, audio books), images, 3D models, reading materials (e.g., electronic book titles), product web pages (e.g., online shopping), and other digital items. For example, commands stored in the command log 214 may include digital music and/or digital videos selected and/or viewed by the user. In other embodiments, commands stored in the command log 214 may include a user's online purchase history and/or the user's online browsing history, including product web pages viewed by the user. The user's selections may then be stored in the command log 214. In addition, the command log 214 may store the frequency with which any of the aforementioned commands have been issued. The generation of a command log 214 may be initiated by the software application 210, the recommendation engine 212, or by a user. For example, in some embodiments, the recommendation engine 212 may monitor and/or record a user's commands and store the command usage history to the command log 214. In the same or other embodiments, the user may store data to the command log 214 to indicate commands the user has issued, files or content the user has selected, and/or ratings the user has assigned to those commands, files, and/or content.

When generated in conjunction with the CAD application described above, the command log 214 may store a history of application commands issued by a user via the CAD application GUI to generate a design file. Once generated, command logs 214 may be stored in a queue in the memory 208 of the client device 102 and transmitted to the server 106 when the client device 102 connects to the network 104. In some embodiments, command logs 214 are transmitted by a client device on a periodic basis, such as once a day, once a month, etc.

Although FIG. 2 shows the recommendation engine 212 as a separate software module, it is also contemplated that the recommendation engine 212 may be integrated into the software application 210 or offered as a software add-on or plug-in for the application 210. When configured as a separate software module, the recommendation engine 212 may be capable of communicating with and receiving information from a variety of different software applications 210.

As also shown, the server 106 includes, without limitation, a central processing unit (CPU) 218, one or more input/output (I/O) devices 220, and a memory 222. The memory 222 is configured to store a recommendation file generator 224 and a command log database 226. The CPU 218 is configured to execute the recommendation file generator 224, which receives a command log 214 from one or more client devices 102 and generates a command recommendation file 216 based on the relationships between commands included in the command log(s) 214. The server 106 then transmits the command recommendation file 216 to the recommendation engines 212 included in the client devices 102.

In some embodiments, the recommendation file generator 224 generates different command recommendation files 216 for different types of client devices 102. For example, separate recommendation files 216 may be generated for client devices 102 executing different types of software applications 210, for users in different industries that are executing the same or different software applications 210, for different categories of users, for different content genres, etc.

Returning now to the client device 102, the recommendation engine 212 included in the client device 102 may be controlled by a user, or the recommendation engine 212 may operate as a background process. When the recommendation engine 212 is controlled by the user, the user may initiate a request for recommended application commands by specifying a type of command, type of project, content genre, etc. for which the user would like to view recommended application commands. Additionally, recommended application commands may be displayed when the user specifies a search query, such as a query for a similar application command. The recommendation engine 212 may further operate automatically or semi-automatically by detecting the user's activities within the software application 210 (e.g., commands issued by the user) and generating similar recommended application commands. The recommended application commands may then be presented to the user and/or queued in a local database for later viewing.

After receiving the command recommendation file 216 from the server 106, the recommendation engine 212 may analyze commands that were previously executed by the user of the client device 102 to determine which application commands should be recommended to the user. For example, the recommendation engine 212 may execute one or more algorithms based on ratings stored in the command recommendation file 216 to determine that an application command is similar to one or more application commands previously issued by the user. Useful algorithms may determine a measure of similarity based on, for example, the user's command log 214 (e.g., the number of times a particular command has been issued by the user), the type of project being modified by the user, a rating assigned to one or more application commands by the user, and/or whether the user has previously issued certain application commands. The recommendation engine 212 may further assign a ranking or similarity score to one or more application commands based on the determined measure(s) of similarity. The recommendation engine 212 also may execute one or more of these algorithms to determine a measure of similarity between application commands and a search query performed by the user of the client device 102.

Based on the analysis of the command recommendation file 216 performed by the recommendation engine 212, the recommendation engine 212 may recommend one or more similar application commands to the user, such as by displaying the application commands in a GUI of the software application 210. For example, if the user is interacting with the entertainment application described above, then the recommendation engine 212 may display recommended digital media content (e.g., videos, music, reading materials, etc.) that the user may enjoy. Accordingly, recommended application commands may be determined and displayed to a user without requiring the user to transmit information to the server 106, such as when the user is offline or when the user does not wish to transmit sensitive data to the server 106 due to privacy concerns.

Figure 3:
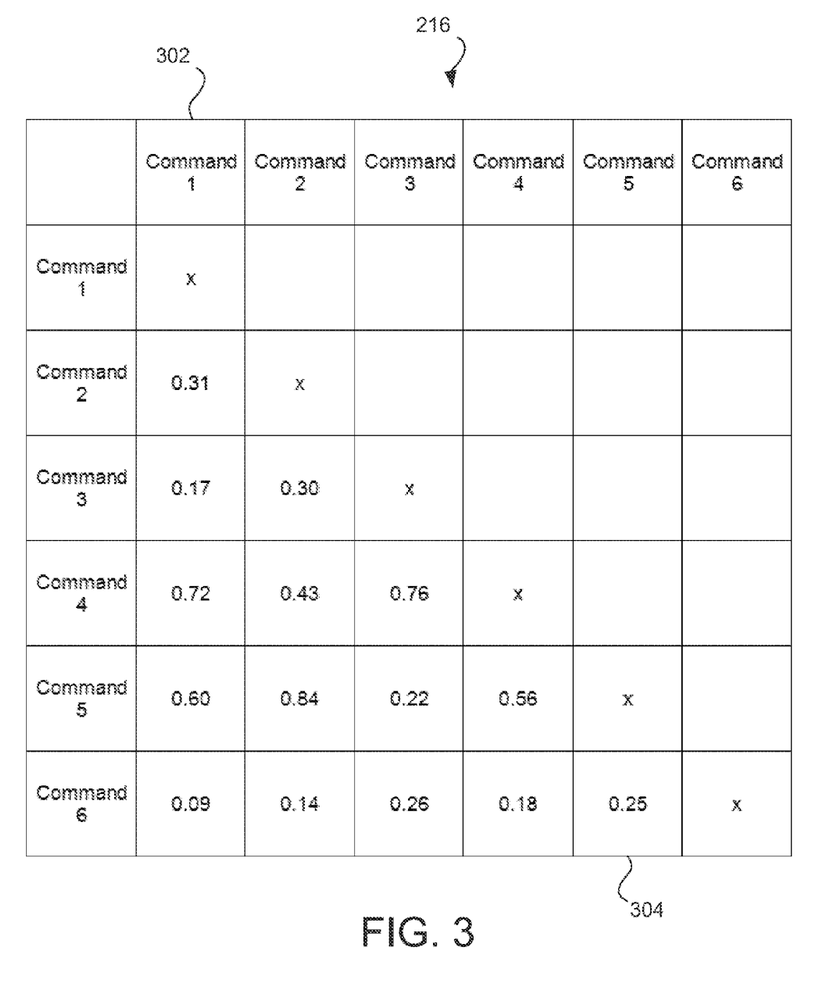
FIG. 3 sets forth a more detailed illustration of the exemplary command recommendation file of FIG. 2, according to one embodiment of the present invention.

FIG. 3 sets forth a more detailed illustration of the exemplary command recommendation file 216 of FIG. 2, according to one embodiment of the present invention. As shown, the command recommendation file 216 may include a command similarity matrix, which stores ratings 304 indicating the similarity between two or more application commands 302. In some embodiments, ratings 304 stored in the command similarity matrix indicate the degree of similarity between two or more application commands 302, enabling the recommendation engine 212 to determine whether certain application commands should be recommended to a user. For example, if a user of client device 102 frequently issues Command 2, but infrequently issues (or has never issued) Command 5, then the recommendation engine 212 may recommend Command 5 to the user, since the command recommendation file 216 indicates a high degree of similarity between Command 2 and Command 5. Similarly, if the user frequently issues Command 1, then the recommendation engine 212 may recommend Command 4 and/or Command 5 to the user, since the command recommendation file 216 indicates a high degree of similarity between Command 1 and Command 4/Command 5.

In general, the command recommendation file 216 may be generated in any technically feasible manner. In some embodiments, ratings included in the command similarity matrix may be generated using collaborative filtering algorithms that use the frequency with which a particular user issues an application command to imply a rating of the application command for that user. Additionally, in order to determine how important a command is to a particular user within a community—while suppressing the influence of commands that frequently used by many users—an inverse user-frequency (cf-iuf) rating function may be implemented. An inverse user-frequency rating may be determined by first calculating the command frequency (cf) to determine a measure of the importance of the application command $c_i$ to the user $u_j$ according to Equation 1, where $n_{ij}$ is the number of occurrences of the application command for user $u_j$, and the denominator is the number of occurrences of all commands for user $u_j$.

$$cf_{ij} = \frac{n_{ij}}{\sum_k n_{kj}} \quad \text{(Eq. 1)}$$

The inverse user frequency (iuf)—a measure of the general importance of the application command—may then be determined based on the percentage of total users that use the application command according to Equation 2, where S is the total number of users in the community, and the denominator is the number of users who use the application command $c_i$.

$$iuf_i = \log \frac{|S|}{|\{u_j : c_i \in u_j\}|} \quad \text{(Eq. 2)}$$

Once $cf_{ij}$ and $iuf_i$ have been determined, the cf-iuf may be determined using Equation 3. A high rating of cf-iuf may be obtained when a command is used frequently by a particular user, but is used by a relatively small portion of the overall population.

$$cf\text{-}iuf_{ij} = cf_{ij} \times iuf_{ij} \quad \text{(Eq. 3)}$$

For each user $u_j$, we may populate a command vector $V_j$ such that each cell, $V_j(i)$, contains a cf-iuf value for each application command $c_i$. These vectors may then be used to compute application command similarities.

Accordingly, rather than simply matching users based on their command usage, the item-based collaborative filtering algorithm described above is used to aggregate application data associated with a larger community of users. The aggregate application data may then be used to generate a command recommendation file 216, which is transmitted to a client device 102 and used to recommend application commands to a user of the client device 102 based on the application commands that were previously executed by the user. In some embodiments, recommended application commands are generated via the recommendation file 216 as a top-N recommendation problem, which identifies a set of N application commands that may be of interest to a user. The top-N application commands may then be displayed to the user in order of ranking. For example, the N application commands may be displayed in a window of an application GUI, and a graphical indicator may be displayed next to each recommended application command. The graphical indicators may represent, for example, the degree of similarity of the recommended application command to application commands that were previously issued by the user and/or the likelihood that the recommended application command will be useful to the user (e.g., based on a cf-iuf value assigned to the application command).

After being presented with recommended application commands (e.g., top-N commands), the user may choose one or more of the commands by selecting the command(s) from the GUI window. Additionally, the user may place a cursor or input object over an application command to view a tooltip that provides a short description of the application command, a rating of the application command, and/or other types of information relevant to the application command. The user may further provide a rating of an application command within the GUI window.

Application command recommendations may be generated each time a user issues an application command. Alternatively, command recommendations may be generated periodically and/or based on certain criteria, such as when a user begins a new session of a software application 210. Additionally, in order to reduce the degree to which generating command recommendations consumes computational resources, recommendations may be generated during idle periods, such as after a threshold idle time (e.g., 0.5 seconds).

In some embodiments, in order to ensure that enough application commands have been executed by the user to provide accurate application command recommendations, the recommendation engine 212 may implement a training period. During the training period, application commands are logged, but no recommendations are provided to the user until one or more criteria have been met. Exemplary criteria for exiting the training period and providing application command recommendations to a user may include determining that the user issues less than three new commands on two consecutive days, determining that the training period has been active for at least 10 days, and/or determining that a certain number of application commands (e.g., 200 commands) have been issued by the user.

Figure 4:
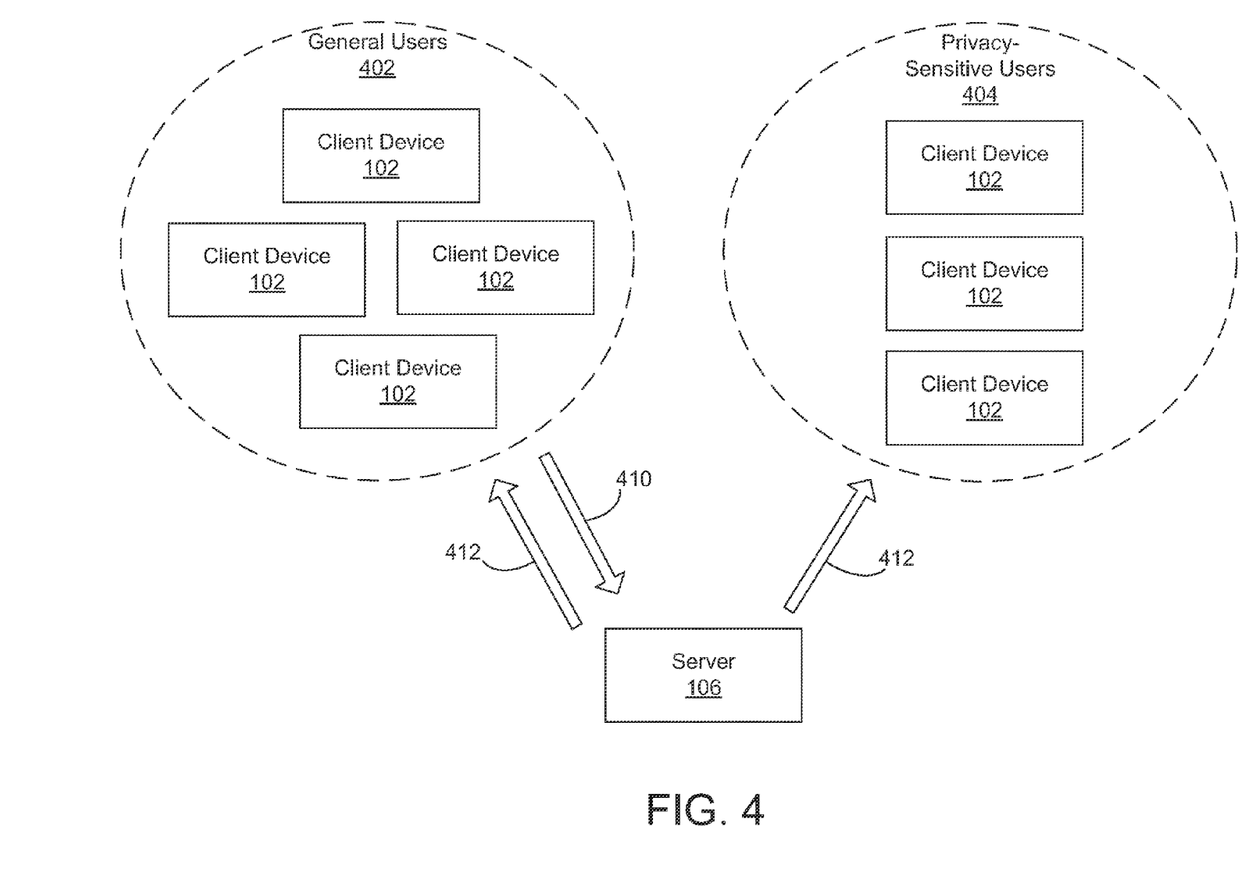
FIG. 4 illustrates the manner in which command logs and command recommendation files are transmitted between the server and the different types of client devices included in FIG. 1, according to one embodiment of the present invention.

FIG. 4 illustrates the manner in which command logs 214 and command recommendation files 216 are transmitted between the server 106 and the different types of client devices 102 included in FIG. 1, according to one embodiment of the present invention. As described above, in order to generate a command recommendation file 216, the recommendation file generator 224 analyzes command logs 214 received from users of client devices 102. However, due to privacy concerns, many users may be reluctant to transmit command logs 214 to the server 106. As such, in various embodiments, a user may indicate to the software application 210 and/or recommendation engine 212 that the user's command log(s) 214 should not be transmitted to the server 106. When a user indicates that command logs 214 should not be transmitted to the server 106, the user's client device 102 may be classified as a privacy-sensitive client device 404. Client devices that transmit 410 command logs 214 to the server 106, on the other hand, may be classified as general client devices 402.

Although privacy-sensitive client devices 404 do not transmit 410 command logs 214 to the server 106, the privacy-sensitive client devices 404 may continue to receive 412 command recommendation files 216 from the server 106, as shown in FIG. 4. That is, aggregate application data associated with other users (e.g., users other than the users of the privacy-sensitive devices 404) may be used to generate a command recommendation file 216. The user of a privacy-sensitive device 404 may then use that command recommendation file 216 to receive recommended application commands based on his or her previously-executed application commands, without transmitting the previously-executed application commands to the server 106. Thus, the server 106 may push command recommendation files 216 to the privacy-sensitive client devices 404—enabling those users to generate personalized command recommendations on their local client device 102—without the privacy-sensitive client devices 404 uploading command logs 214 to the server 106.

Figure 5A:
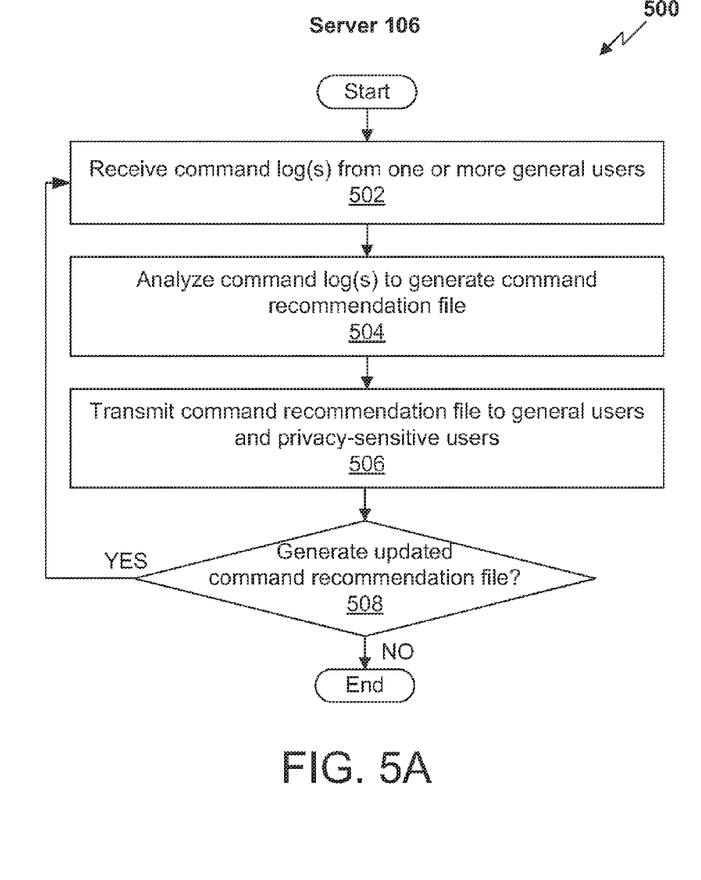
FIG. 5A is a flow diagram of method steps for generating and transmitting a command recommendation file to a client device, according to one embodiment of the present invention.
Figure 5B:
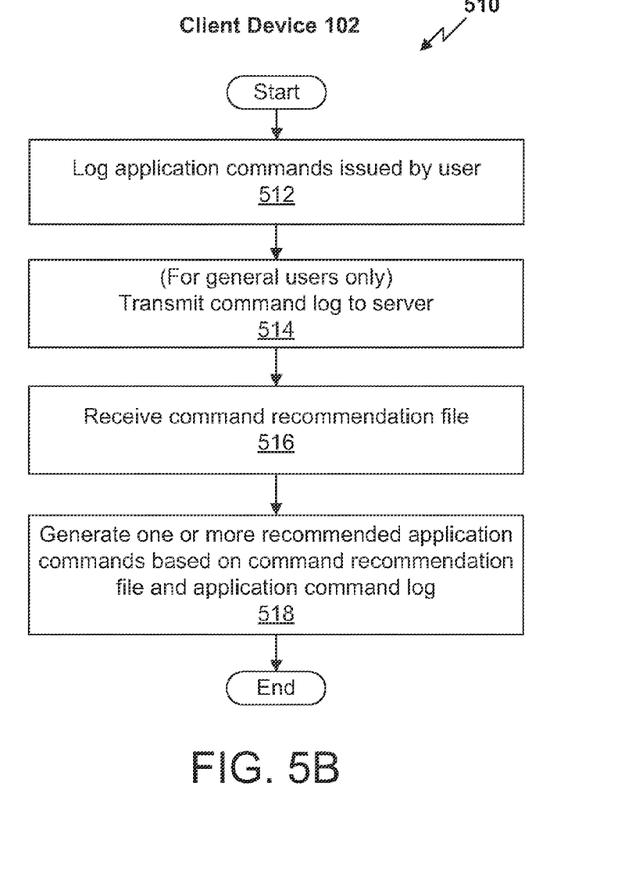
FIG. 5B is a flow diagram of method steps for generating recommended application commands for a particular client device based on a command recommendation file, according to one embodiment of the present invention.

FIG. 5A is a flow diagram of method steps for generating and transmitting a command recommendation file 216 to a client device 102, according to one embodiment of the present invention. FIG. 5B is a flow diagram of method steps for generating recommended application commands for a client device 102 based on a command recommendation file 216, according to one embodiment of the present invention. Although both sets of method steps are described in conjunction with FIGS. 1-4, persons skilled in the art will understand that any system configured to perform either of the sets of method steps, in any order, falls within the scope of the present invention.

As shown in FIG. 5A, a method 500 begins at step 502, where the recommendation file generator 224 receives command logs 214 from one or more general client devices 402. At step 504, the recommendation file generator 224 analyzes the command logs 214 to generate a command recommendation file 216. For example, as described above, the recommendation file generator 224 may generate a command recommendation file 216 using inverse user frequency (iuf) algorithms. At step 506, the server 106 transmits the command recommendation file 216 to the general client devices 402 and the privacy-sensitive client devices 404.

Next, at step 508, the recommendation file generator 224 determines whether an updated command recommendation file 216 should be generated. An updated command recommendation file 216 may be generated when certain criteria are met. For example, the recommendation file generator 224 may generate an updated command recommendation file 216 when a certain period of time has elapsed since a command recommendation file 216 was last generated and/or when a certain number of commands logs 214 are received by the recommendation file generator 224. If the recommendation file generator 224 determines that an updated command recommendation file 216 should be generated, then the method 500 returns to step 502. If the recommendation file generator 224 determines that an updated command recommendation file 216 should not be generated, then the method 500 ends.

As shown in FIG. 5B, a method 510 begins at step 512, where a software application 210 and/or the recommendation engine 212 included in a client device 102 logs application commands issued by a user. In some embodiments, the application commands are stored in a command log 214. At step 514, if the client device 102 is a general client device 402, then the client device 102 transmits the command log 214 to the server 106. If, on the other hand, the client device 102 is a privacy-sensitive client device, then the command log 214 is not transmitted to the server 106, and the method 500 proceeds to step 516.

At step 516, the recommendation engine 212 receives a command recommendation file 216 from the server 106. As described above, the command recommendation file 216 may include a command similarity matrix that indicates the relationships (e.g., similarities) between various application commands. Next, the recommendation engine 212 generates one or more recommended application commands to be displayed to the user. The recommendation engine 212 may generate recommended application commands using the command recommendation file 216 and one or more application commands that were previously issued by the user, such as application commands that are stored in the command log 214. The method 510 then ends.

In sum, one or more general client devices transmit command logs to a server. A recommendation file generator included in the server analyzes the command logs to generate a command recommendation file, which may include a command similarity matrix. The command similarity matrix includes a plurality of entries, each of which stores a rating indicating the similarity between two or more application commands. The server then transmits the command recommendation file to both general client devices and privacy-sensitive client devices. After receiving the command recommendation file, a recommendation engine residing within a given client device generates recommended applications commands based on commands that were previously issued by the user of that client device. The recommended application commands are then displayed to the user of the client device.

One advantage of the techniques described herein is that a client device is able to receive application command recommendations—based on application commands that were previously issued by a user of the client device— without requiring the client device to transmit its application activity data to a third-party server. As such, a user of a privacy-sensitive client device can receive command recommendations that are relevant to the user's workflow without revealing sensitive application data. Additionally, application command recommendations can be provided by the client device in real-time, even when the client device is offline.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable processors.

Embodiments of the disclosure may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet. In context of the present disclosure, a user may access applications (e.g., video processing and/or speech analysis applications) or related data available in the cloud.

The flowchart and block diagrams in the Figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for providing application command recommendations to a privacy-sensitive client device, the method comprising:
  receiving a command log from each general client device included in a plurality of general client devices;
  analyzing the command logs to generate a command recommendation file, wherein the command recommendation file indicates a relationship between one or more application commands executed by at least one of the general client devices and one or more application commands that are available for execution by the privacy-sensitive client device, wherein the privacy-sensitive client does not share command log information associated with the one or more application commands executed by the at least one general client device; and
  transmitting the command recommendation file to the privacy-sensitive client device.

2. The method of claim 1, wherein the command recommendation file comprises a plurality of ratings, and each rating indicates a relationship between two or more application commands executed by at least one of the general client devices.

3. The method of claim 1, wherein the command recommendation file comprises a command similarity matrix having a plurality of entries, and each entry included in the plurality of entries stores a rating indicating the similarity between two or more application commands.

4. The method of claim 1, further comprising generating the command recommendation file based on the command logs received from the plurality of general client devices.

5. The method of claim 4, wherein generating the command recommendation file is performed based on an inverse user-frequency rating function.

6. The method of claim 1, further comprising:
  receiving an updated command log from one or more general client devices;
  analyzing the one or more updated command logs to generate an updated command recommendation file; and
  transmitting the updated command recommendation file to the privacy-sensitive client device.

7. The method of claim 1, wherein the one or more application commands executed by the at least one general client device comprise digital content selections.

8. A non-transitory computer-readable storage medium including instructions that, when executed by a processor, cause the processor to provide recommended software application commands to a client device, by performing the steps of:
  receiving a command log from each general client device included in a plurality of general client devices;
  analyzing the command logs to generate a command recommendation file, wherein the command recommendation file indicates a relationship between one or more application commands executed by at least one of the general client devices and one or more application commands that are available for execution by the privacy-sensitive client device, wherein the privacy-sensitive client does not share command loci information associated with the one or more application commands executed by the at least one general client device; and
  transmitting the command recommendation file to the privacy-sensitive client device.

9. The non-transitory computer-readable storage medium of claim 8, wherein the command recommendation file comprises a plurality of ratings, and each rating indicates a relationship between two or more application commands executed by at least one of the general client devices.

10. The non-transitory computer-readable storage medium of claim 8, wherein the command recommendation file comprises a command similarity matrix having a plurality of entries, and each entry included in the plurality of entries stores a rating indicating the similarity between two or more application commands.

11. The non-transitory computer-readable storage medium of claim 8, further comprising generating the command recommendation file based on the command logs received from the plurality of general client devices.

12. The non-transitory computer-readable storage medium of claim 11, wherein generating the command recommendation file is performed based on an inverse user-frequency rating function.

13. The non-transitory computer-readable storage medium of claim 8, further comprising:
receiving an updated command log from one or more general client devices;
analyzing the one or more updated command logs to generate an updated command recommendation file; and
transmitting the updated command recommendation file to the privacy-sensitive client device.

14. The non-transitory computer-readable storage medium of claim 8, wherein the one or more application commands executed by the at least one general client device comprise digital content selections.

15. The non-transitory computer-readable storage medium of claim 8, wherein the privacy-sensitive client device does not share any command logs.

16. A computer-implemented method for providing application command recommendations to a privacy-sensitive client device, the method comprising:
receiving a command recommendation file from a server, wherein the command recommendation file indicates a relationship between one or more application commands executed by at least one general client device and one or more application commands that are available for execution by the privacy-sensitive client device, wherein the privacy-sensitive client does not share command loci information associated with the one or more application commands executed by the at least one general client device;
determining one or more application commands executed by the privacy-sensitive device; and
generating one or more application command recommendations based on the one or more application commands executed by the privacy-sensitive device.

17. The method of claim 16, wherein the privacy-sensitive client device accesses the command recommendation file and generates the one or more application command recommendations while the privacy-sensitive client device is offline.

18. The method of claim 16, wherein the command recommendation file comprises a plurality of ratings, each rating indicating a relationship between two or more application commands executed by a plurality of general client devices that includes the at least one general client device.

19. The method of claim 16, wherein the command recommendation file comprises a command similarity matrix having a plurality of entries, and each entry included in the plurality of entries stores a rating indicating the similarity between two or more application commands.

20. The method of claim 19, wherein one or more of the ratings are based on an inverse user-frequency rating.

21. The method of claim 16, wherein the one or more application commands executed by the at least one general client device comprise digital content selections.

22. The method of claim 16, wherein the one or more application command recommendations are generated without transmitting any command logs from the privacy-sensitive client device to the server.

* * * * *

UNITED STATES PATENT AND TRADEMARK OFFICE
CERTIFICATE OF CORRECTION

| | | |
|---|---|---|
| PATENT NO. | : 9,530,024 B2 | Page 1 of 1 |
| APPLICATION NO. | : 14/333063 | |
| DATED | : December 27, 2016 | |
| INVENTOR(S) | : Wei Li et al. | |

It is certified that error appears in the above-identified patent and that said Letters Patent is hereby corrected as shown below:

On the Title Page

(71) Applicant: please delete "San Rafael (CA)" and insert --San Rafael, CA (US)--;

In the Claims

Column 12, Claim 8, Line 45, please delete "loci" and insert --log--;

Column 13, Claim 16, Line 29, please delete "loci" and insert --log--.

Signed and Sealed this
Second Day of May, 2017

Michelle K. Lee
*Director of the United States Patent and Trademark Office*